July 16, 1957 D. W. KELBEL ET AL 2,799,179
TRANSMISSION
Filed May 2, 1951 4 Sheets-Sheet 1

Inventors:
Donald W. Kelbel and
Clifford L. Swift
By: Keith J. Bleuer
Atty.

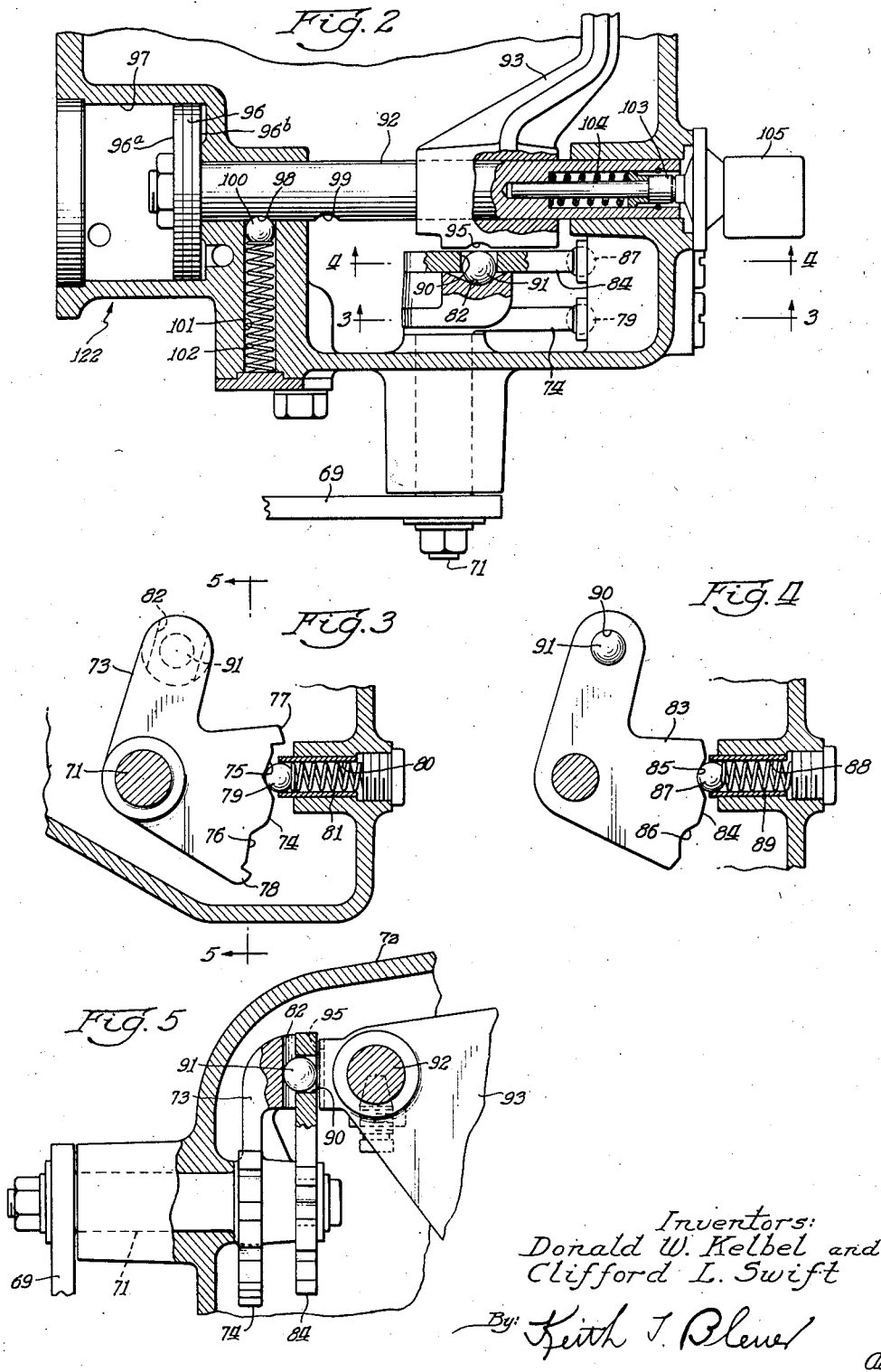

July 16, 1957 D. W. KELBEL ET AL 2,799,179
TRANSMISSION
Filed May 2, 1951 4 Sheets-Sheet 3
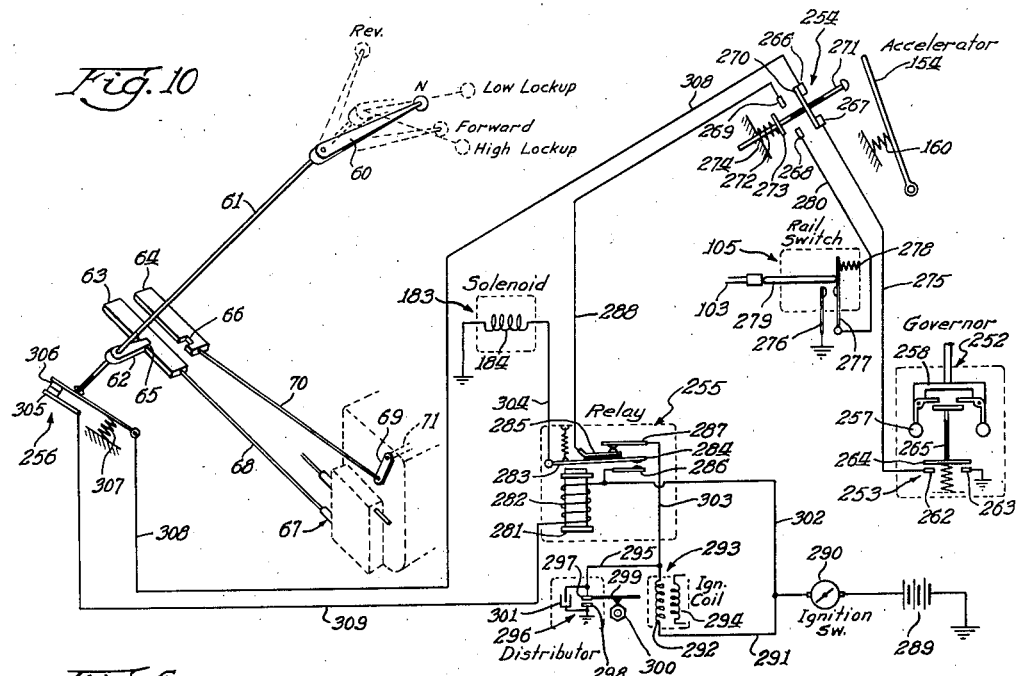
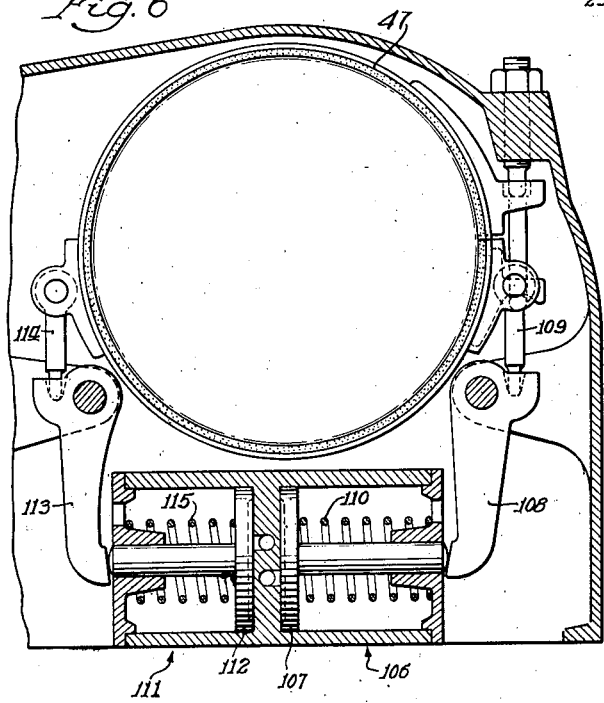
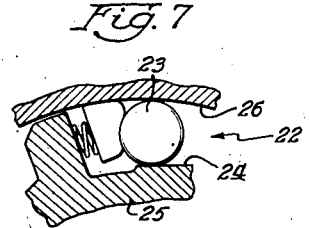
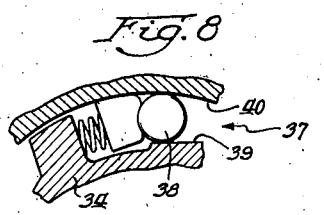
Inventors:
Donald W. Kelbel and
Clifford L. Swift

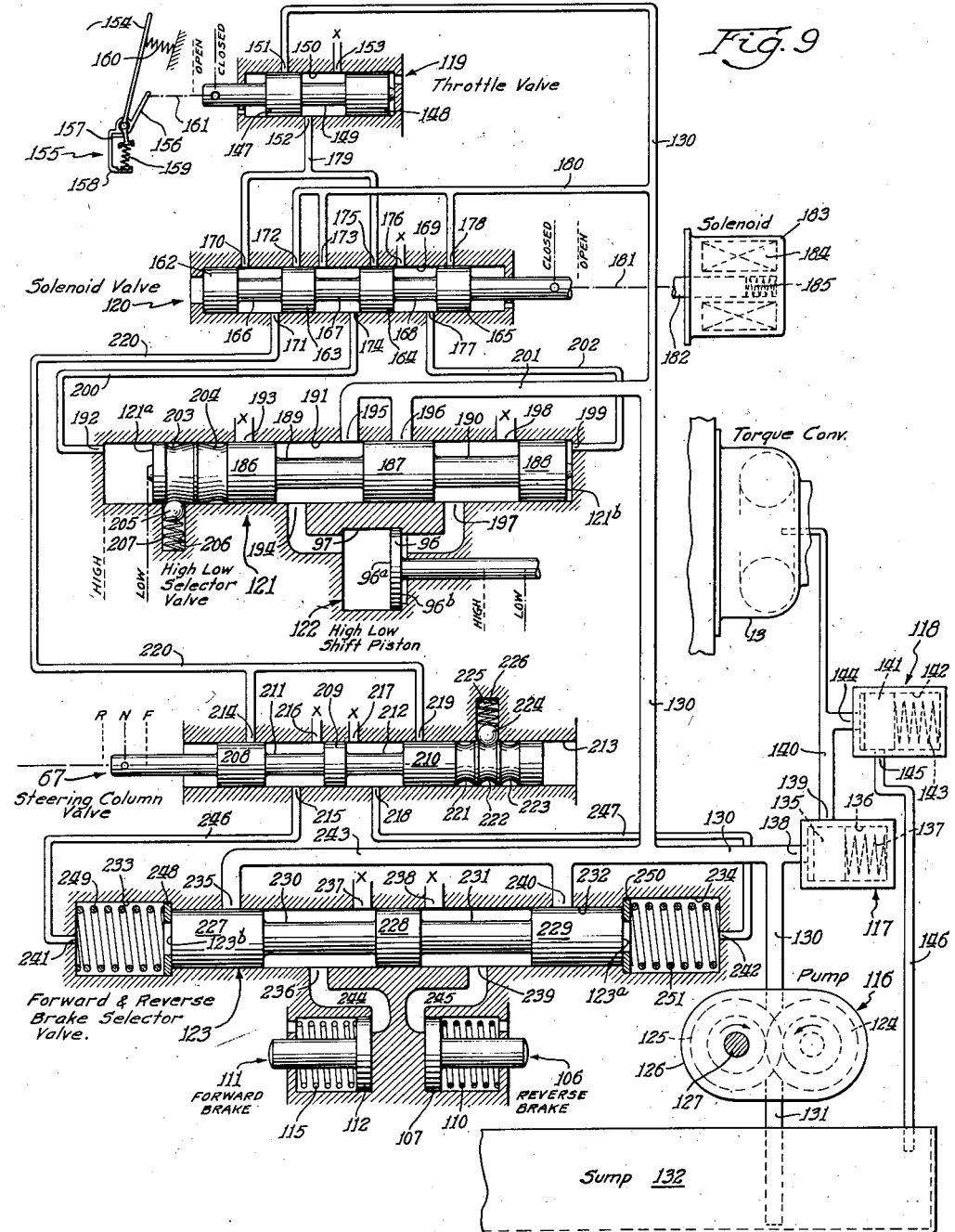

United States Patent Office 2,799,179
Patented July 16, 1957

2,799,179

TRANSMISSION

Donald W. Kelbel and Clifford L. Swift, Muncie, Ind., assignors to Borg-Warner Corporation, Chicago, Ill., a corporation of Illinois Application May 2, 1951, Serial No. 224,161

9 Claims. (Cl. 74—472)

Our invention relates to transmissions and more particularly to transmissions for automotive vehicles.

It is an object of our invention to provide an improved automotive transmission having a gear set in tandem with a hydraulic torque converter which will provide a reverse drive, a low speed forward drive and a high speed forward drive, and, in particular, it is an object to so construct the transmission that the high speed drive is a direct drive as far as the gear set is concerned and exclusive of it.

It is another object of the invention to provide an improved control system for the transmission including a servo-motor for changing the drive from the low speed forward drive to the high speed forward drive under automatic control and to provide means under the control of a manual lever for overruling the servomotor for completing the high speed forward drive under manual control and maintaining it in this drive.

It is another object of the invention to provide an improved hydraulic transmission control system having improved valving for automatically changing the drive through the transmission from a low speed forward drive to a high speed forward drive.

The invention consists of the novel constructions, arrangements and devices to be hereinafter described and claimed for carrying out the above stated objects and such other objects as will appear from the following description of a preferred form of the invention, illustrated with reference to the accompanying drawings, in which:

Fig. 2 is a sectional view taken on line 2—2 of Fig. 1 in the direction indicated;

Figure 1:
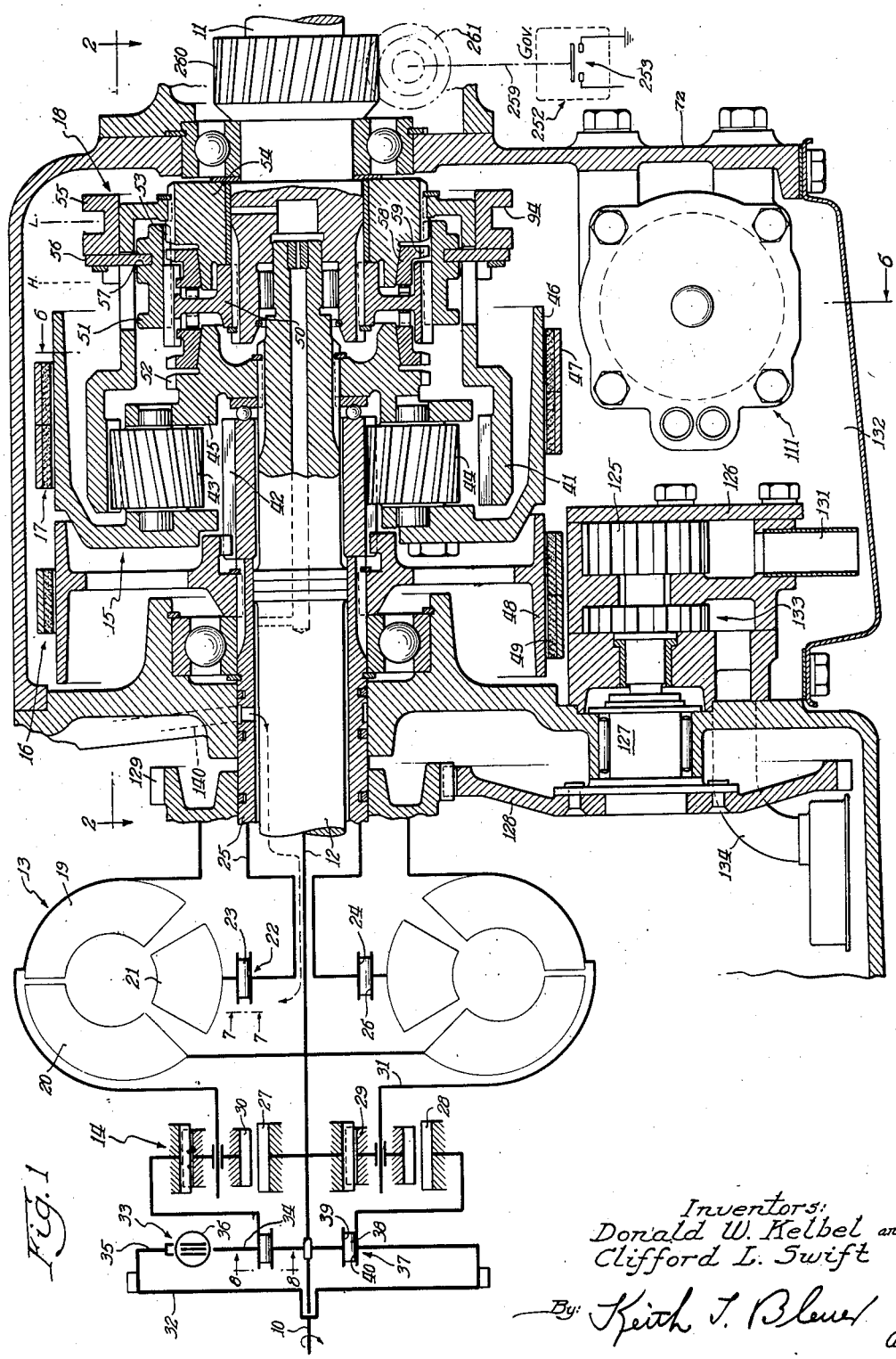
Fig. 1 is a longitudinal sectional view, partially schematic, of a transmission embodying the principles of the invention.

Figs. 3 and 4 are sectional views taken respectively on lines 3—3 and 4—4 of Fig. 2 in the directions indicated;

Fig. 5 is a sectional view taken on line 5—5 of Fig. 3;

Fig. 6 is a sectional view taken on line 6—6 of Fig. 1 in the direction indicated;

Figs. 7 and 8 are sectional views taken respectively on lines 7—7 and 8—8 of Fig. 1 in the directions indicated;

Fig. 9 is a schematic illustration of the hydraulic control system used with the transmission; and Fig. 10 is a schematic view of the electrical control system used in connection with the hydraulic control system shown in Fig. 9.

Like characters of reference designate like parts in the several views.

Referring now to the drawings, the transmission illustrated comprises a drive shaft 10, a driven shaft 11 and an intermediate shaft 12 piloted within the shafts 10 and 11. The shaft 10 is adapted to be driven from the crankshaft of the engine of the vehicle in which the transmission is installed, and the driven shaft 11 is adapted to drive road wheels of the vehicle through any suitable drive connections (not shown). The transmission comprises also in general, a hydraulic torque converter 13, a planetary gear set 14 for driving the hydraulic torque converter, a planetary gear set 15 disposed between the hydraulic torque converter and the driven shaft 11, a forward drive brake 16, a reverse drive brake 17 and a direct drive positive clutch unit 18.

The hydraulic torque converter 13 comprises a bladed impeller 19, a bladed runner 20 and a bladed stator or reaction element 21. The hydraulic torque converter 13 is of a well-known type, and the blading is so constructed that the impeller 19 drives the runner by means of the fluid in the converter at an increased torque initially when the stator 21 is stationary, and after a relatively high speed of the runner 20 is reached, the fluid in the torque converter tends to rotate the stator 21 in the forward direction, that is, in the same direction as the shaft 10 is rotated, and the unit 13 functions as a simple fluid coupling. A one-way brake 22 is provided for allowing free forward rotation of the stator 21 but braking it from reverse rotation. The brake comprises a plurality of rollers 23 adapted to wedge between inclined ramp surfaces 24 provided on a shaft 25 and an outer cylindrical race 26 provided on the stator 21.

The planetary gear set 14 comprises a sun gear 27, a ring gear 28, a plurality of planet gears 29 in mesh with the sun gear 27, a plurality of planet gears 30 each in mesh with one of the planet gears 29 and in mesh also with the ring gear 28, and a planet gear carrier 31 fixed with respect to the impeller 19 of the hydraulic torque converter 13. The sun gear 27 is fixed to the intermediate shaft 12, and the ring gear 28 is connected to rotate with the drive shaft 10, this connection being through the engine flywheel 32 and a vibration dampener unit 33. The flywheel 32 is fixed to the drive shaft 10. The vibration dampener 33 is of a usual construction and comprises a hub 34 fixed with respect to the ring gear 28 and provided with a plurality of slots near its outer periphery, a slotted annular member 35 fixed to the flywheel 32 and a plurality of springs 36 fitting in the slots of the members 34 and 35 which allow a limited movement of the members 34 and 35 with respect to each other against the action of the springs 36. A one-way clutch 37 is provided between the hub 34 and the shaft 12. The one-way clutch 37 comprises a plurality of rollers 38 adapted to wedge between ramps 39 and an outer cylindrical race 40.

The planetary gear set 15 comprises a ring gear 41, a sun gear 42, a plurality of planet gears 43 in mesh with the ring gear, a plurality of planet gears 44 each in mesh with one of the planet gears 43 and also with the sun gear 42, and a planet gear carrier 45. The carrier 45 is splined to the shaft 12 and carries a brake drum 46 which is a part of the brake 17. A brake band 47 is provided for the drum 46 and is also part of the brake 17. The sun gear 42 is connected with the sleeve shaft 25 by means of a brake drum 48, and this drum constitutes a part of the brake 16, the remainder of the brake including a brake band 49 engageable on the drum 48.

The positive clutch unit 18 comprises a hub 50 splined on the shaft 11 and having a shiftable clutch element 51 splined to it. The shiftable clutch element 51 is adapted to engage with teeth 52 formed on the carrier 45 or with teeth 53 formed on a hub element 54 which is connected to the ring gear 41 of the planetary gear set 15. The clutch element 51 is adapted to be shifted to engage with either the clutch teeth 52 or 53 by means of a shift collar 55 slidably disposed on an extended portion of the ring gear 41 and carrying a fork 56 extending through a slot in the ring gear into a peripheral groove 57 in the clutch element 51. A synchronizer ring 58 having blocking teeth 59 is disposed on either side of the hub 50 for assisting in synchronizing the speeds of the clutch element 51 and the teeth 52 and 53 with which the clutch element is about to engage and preventing such engagement before synchronization. The synchronizing rings 58 are of usual and ordinary construction, and hence will not be further described in detail.

In operation, a low speed forward drive is obtained by engaging the brake 16 and having the clutch member 51 in its illustrated position in engagement with the clutch teeth 53. The brake 16 functions through its drum 48 to hold both the sun gear 42 and the shaft 25 stationary, and the stator 21 is held from reverse rotation by means of the one-way brake 22 disposed between the stator and the shaft 25. Under these conditions, the impeller 19 is driven from the drive shaft 10 at an increased speed, as explained below, it being assumed that the vehicle is being started and that the shafts 12 and 11 are stationary. As has been explained, the ring gear 28 is connected with the drive shaft 10 through the vibration dampener 33, and when the sun gear 27 which is fixed on a shaft 12 is stationary, the impeller 19 which is connected with the carrier 31 is driven along with the carrier at an overspeed or overdrive with respect to the drive shaft 10 and ring gear 28 and in the forward direction. The runner 20 is thus driven and starts to rotate along with the shaft 12. The planet gear carrier 45 is thus driven by the runner 20, and since the sun gear 42 of the planet gear set 15 is held stationary by the brake 16, the ring gear 41 of the gear set 15 is driven at an underdrive and at increased torque with respect to the shaft 12. This drive of the ring gear 41 is transmitted to the driven shaft 11 through the positive clutch unit 18, the drive being from the ring gear 41 through the teeth 53 to the shiftable clutch element 51 and from thence through the hub 50 for the element 51 to the driven shaft 11. The driven shaft 11 is thus driven in a low speed drive at a torque which is increased both by the hydraulic torque converter 13 as well as by the planet gear set 15. As the shafts 12 and 11 begin to rotate, the speed of the impeller 19 is slackened and decreased with respect to the speed of the drive shaft 10, since the sun gear 27 is fixed to and rotates along with the intermediate shaft 12. Eventually, as the speed of the shafts 12 and 11 increase still further, the parts of the planetary gear unit 14 all rotate substantially as a unit with the speed of the runner 20 being substantially that of the impeller 19, and at this time the stator 21 rotates along with the impeller and runner with the one-way brake 22 over-running. The drive between the shafts 10 and 12 is, incidentally, in two parallel paths, one path being through the planet gears 29 and 30 from the ring gear 28 to the sun gear 27 and shaft 12 and the other path being through the planet gears, carrier 31 and converter 13 to the shaft 12.

A direct drive through the transmission is obtained by moving the clutch element 51 to the left as seen in Fig. 1 to engage with the clutch teeth 52. Such engagement is prevented by the synchronizer ring 58 to the left of the hub 50 until substantial synchronism in speed between the clutch element 51 and the teeth 52 is reached which may be obtained by temporarily releasing the accelerator for the vehicle engine allowing the speed of the drive shaft 10 to decrease relative to the shaft 11. When the clutch element 51 is engaged with the teeth 52, the drive from the shaft 10 to the shaft 12 is the same as previously described in connection with low speed drive, and the drive from the shaft 12 to the shaft 11 is directly through the planet gear carrier 45, the teeth 52, the clutch element 51, and the hub 50 to the shaft 11. The drive in this case also includes the hydraulic torque converter; however, as in low speed forward drive, the planetary gear set 14 provides a two path power flow with a portion of the power from the ring gear 28 connected with the drive shaft 10 being through the planet gear pinions 29 and 30 to the sun gear 27 and the remainder being through the planet gear carrier 31 and hydraulic torque converter 13 to the runner 20 fixed on the intermediate shaft 12.

The one-way clutch 37 functions to directly connect the shaft 12, exclusive of the hydraulic torque converter, with the flywheel 32 through the vibration dampener 33, when there is a coast load on the transmission tending to drive the shaft 12 faster than the shaft 10, and thus provides a greater engine braking effect than would otherwise be obtained.

Reverse drive is obtained by applying the brake 17, namely, by engaging the band 47 on the drum 46 connected with the carrier 45 of the gear set 15. The carrier 45 is connected through the shaft 12 with the runner 20, and the runner 20 is thereby held stationary. When the vehicle is being started, the impeller 19 is driven at an overspeed with respect to the shaft 10 by means of the planetary gear set 14, and the stator 21 is driven in the reverse direction. This reverse drive is transmitted through the one-way brake 22 which now functions as a clutch, and causes the shaft 25 and sun gear 42 connected through the drum 48 with the shaft 25 to rotate in the reverse direction. This reverse rotation is transmitted through the planetary gear set 15, and the ring gear 41 is driven in the reverse direction at an increased torque. This reverse rotation of the ring gear 41 is transmitted through the hub member 54, the clutch teeth 53, the clutch sleeve 51 and hub 50 to the driven shaft 11.

The controls for the transmission comprise a manually operable selector lever 60 which may preferably be located immediately beneath the steering wheel of the vehicle. The shift lever 60 is fixed on a shift rod 61 carrying a finger 62. Two shift rails 63 and 64 are located adjacent the finger 62, and the rails are respectively provided with slots 65 and 66 adapted to receive the end of the finger 62 depending on the longitudinal movement given the rod 61 and finger 62 by means of the lever 60. The shift rail 63 is connected with a valve 67 by means of a link 68, and the rail 64 is connected to a shift lever 69 by means of a link 70.

The lever 69 is arranged to control movement of the collar 55 in the transmission. The lever 69 is mounted on a shaft 71 extending through a portion of the transmission casing 72 and on which is fixed a shift lever 73. The lever 73 is provided with a segment portion 74 having slots 75 and 76 therein and stops 77 and 78 on the ends of the segment portion 74. A ball 79 movably disposed in a cylindrical cavity 80 provided in the transmission casing 72 is adapted to fit into the slots 76 and 77 and is acted on by a spring 81 to form a detent mechanism. The lever 73 is provided with a slant sided slot 82 in a face thereof as shown.

An oscillatable member 83 is loosely mounted on the shaft 71. The member 83 is provided with a segment portion 84 having two slots 85 and 86 therein adapted to receive a ball 87 which is slidably disposed in a cylindrical cavity 88 in the casing portion 72 and is acted on by a spring 89. The ball 87 acts as a detent means with respect to the member 83, similarly to the ball 79 for the lever 73. The member 83 is provided with an opening 90 therethrough in which a ball 91 is slidably disposed.

A shift rail 92 has fixed thereon a fork 93 which extends into a circumferential groove 94 in the clutch sleeve 55. The fork 93 is provided with a portion in substantial contact with the member 83 and has formed therein a spherical indentation 95 adapted to receive the ball 91. The shift rail 92 has fixed on one end thereof a piston 96 slidably disposed in a cylindrical cavity 97. The rail 92 has notches 98 and 99 in its periphery, and a ball 100 is adapted to seat in either of the notches 98 and 99. The ball is slidably disposed in a cylindrical cavity 101 and is acted on by a spring 102 so that it acts as detent means similar to the balls 79 and 87.

The shift rail 92 has a plunger 103 disposed in a central cavity formed in the rail, and a spring 104 is provided in the cavity for acting on the plunger 103. The plunger 103 is adapted to act on a rail switch 105 constituting a part of the electrical control system for the transmission which will hereinafter be described.

The reverse brake 17 is actuated by a servomotor 106 comprising a fluid pressure actuated piston 107 acting through a lever 108 and a pin 109 pivotally connected with one end of the band 47 for engaging the band when fluid pressure is applied on the piston. A spring 110 is provided for acting on the piston 107 for returning it to a brake disengaging position when fluid pressure is released from the piston. The forward brake 16 is actuated by a servomotor 111 which comprises a piston 112 acting through a lever 113 and a pin 114 pivotally mounted on one end of the band 49 for engaging the band on the drum 48. A spring 115 is provided for acting on the piston 112 to return it to a brake disengaging position position when fluid pressure is released from the piston.

The hydraulic controls for the transmission (see Fig. 9) comprise, in general, a fluid pump 116, a high pressure relief valve 117, a low pressure relief valve 118, a throttle valve 119, a solenoid valve 120, a high-low selector valve 121, the steering column selector valve 67, a high-low servomotor 122 including the piston 96, a forward and reverse brake selector valve 123, and the servomotors 106 and 111.

The pump 116 is provided for supplying fluid under pressure to both the hydraulic control system and also the hydraulic torque converter 13. The pump 116 comprises two gears 124 and 125 in mesh with each other and disposed in a pump casing 126. The gear 125 is mounted on a shaft 127 (see Fig. 1) which is driven in order to rotate the gear 125 in the direction indicated in Fig. 9 by means of gears 128 and 129. The gear 128 is fixed with respect to the shaft 127, and the gear 129 is fixed with respect to the impeller 19 of the hydraulic torque converter 13. The pump 116 is of an ordinary construction and by rotation of the gears 124 and 125 in the directions indicated, the pump discharges fluid into a conduit 130 from an inlet conduit 131. The inlet conduit 131 extends into the fluid sump 132 of the transmission disposed beneath the gear set 15 for drawing fluid out of the sump.

Another pump 133 of less capacity but similar construction is also driven from the shaft 127 and functions to draw fluid from the portion of the transmission casing 72 beneath the torque converter 13 through a conduit 134 and to discharge it into the sump 132. The pump 133 is simply for the purpose of preventing leakage from the torque converter 13 and associated parts from accumulating in the forward part of the transmission casing 72.

The fluid discharged into the conduit 130 by the pump 116 is maintained at a predetermined high pressure, such as 50 lbs. per sq. in., by means of the relief valve 117, and this valve comprises a piston 135 slidably disposed in a cylindrical cavity 136 and acted on by a spring 137. The cavity 136 is provided with a port 138 in its end connected with the conduit 130 and is provided with a port 139 in its side connected with a discharge conduit 140. The conduit 140 is connected with the hydraulic torque converter 13 for the purpose of supplying fluid to the torque converter to keep it filled.

The relief valve 118 functions to maintain the pressure in the converter 13 and in the conduit 140 at some less value, such as 25 lbs. per sq. in., and the valve 118 comprises a piston 141 slidably disposed within a cylindrical cavity 142 and acted on by a spring 143. The cavity is provided with a port 144 in its end connected with the conduit 140 and with a port 145 in its side connected with an exhaust conduit 146 adapted to discharge into the sump 132.

The throttle valve 119 is provided with lands 147 and 148 with a groove 149 therebetween. The valve is disposed in a cylindrical cavity 150 having ports 151, 152 and 153. The port 151 is connected with the fluid supply conduit 130, and the port 153 is an exhaust port adapted to freely discharge fluid into the sump 132. The valve 119 is connected with the accelerator 154 of the vehicle by means of an overcenter device 155. The overcenter device may be of any suitable construction and is shown to comprise a lever 156 coaxially mounted with respect to the accelerator 154, an arm 157 carried by the accelerator 154, an arm 158 carried by the lever 156 and a compression spring 159 disposed between the arms 157 and 158. Any usual spring means, such as the spring 160 may be utilized for returning the accelerator from an open throttle position to a closed throttle position, and the lever 156 is connected by any suitable means, such as the link 161, with the valve 119. It will be understood that the accelerator 154 is connected with the carburetor (not shown) of the vehicle engine by the usual connections (not shown).

The solenoid valve 120 comprises lands 162, 163, 164 and 165 separated by grooves 166, 167 and 168. The valve is disposed within a cylindrical cavity 169. The cavity is provided with ports 170, 171, 172, 173, 174, 175, 176, 177 and 178. The ports 170 and 175 are connected by means of a conduit 179 with the port 152 for the throttle valve; the ports 172, 173 and 178 are connected with the fluid supply conduit 130 by means of a conduit 180; and the port 176 is an exhaust port through which fluid may freely discharge into the sump 132. The valve 120 is connected by any suitable means such as a link 181 with the armature 182 of an electric solenoid 183. The solenoid 183 is provided with an electric winding 184 surrounding the armature 182, and a spring 185 is provided for returning the valve 120 into its illustrated position after the solenoid 183 has been deenergized.

The high-low selector valve 121 is provided with lands 186, 187 and 188 separated by grooves 189 and 190. The valve is slidably disposed in a cylindrical cavity 191. The cavity 191 is provided with ports 192, 193, 194, 195, 196, 197, 198 and 199. The port 192 is connected to the port 174 of the solenoid valve 120 by means of a conduit 200; the ports 193 and 198 are exhaust ports adapted to freely discharge into the sump 132; the port 194 is connected with one end of the cavity 97 for the piston 96; the port 197 is connected with the other end of the cavity 97; the ports 195 and 196 are connected by means of a conduit 201 with the fluid supply conduit 130; and the port 199 is connected by means of a conduit 202 with the port 177 of the solenoid valve 120. The land 186 in the valve 121 is provided with two notches 203 and 204 and a ball 205 is adapted to seat in either of these notches. The ball 205 is disposed in a cylindrical cavity 206 and is acted on by a spring 207, so that the ball together with the notches 203 and 204 act as detent mechanism for the valve 121.

The steering column valve 67 is provided with lands 208, 209 and 210 separated by grooves 211 and 212. The valve is slidably disposed in a cylindrical cavity 213. The cavity is provided with ports 214, 215, 216, 217, 218 and 219. The ports 214 and 219 are connected by means of a conduit 220 with the port 171 of the solenoid valve 120, and the ports 216 and 217 are bleed ports adapted to freely discharge into the sump 132. The valve 67 is provided with notches 221, 222 and 223, and a ball 224 is adapted to seat in these notches. The ball 224 is slidably disposed in a cylindrical cavity 225 and is acted on by a spring 226 so that the ball acts as detent mechanism for the valve 67.

The forward and reverse brake selector valve 123 is provided with lands 227, 228 and 229 separated by grooves 230 and 231. The valve is slidably disposed within a cylindrical cavity 232 which is in communication with enlarged cavities 233 and 234 on its ends. The cavity 232 is provided with ports 235, 236, 237, 238, 239 and 240; the cavity 233 is provided with a port 241 and the cavity 234 is provided with a port 242. The ports 235 and 240 are connected by means of a conduit 243 with the fluid pressure conduit 130; the port 236 is connected to supply fluid under pressure to the forward brake piston 112 by means of a conduit 244; the ports 237 and 238 are exhaust ports for freely discharging fluid into the sump 132 and the port 239 is connected to supply fluid under pressure to the reverse brake piston 107 by means of a conduit 245. The port 241 of the cavity 233 is connected with the port 215 of the steering column valve 67 by means of a conduit 246, and the port 242 of the cavity 234 is connected with the port 218 of the valve 67 by means of a conduit 247. A washer 248 is slidably disposed in the cavity 233 and is yieldably held at the open end of the cavity 233 by means of a spring 249. A similar washer 250 is slidably disposed in the cavity 234 and is yieldably held at the open end of the cavity 234 by means of a spring 251.

The electrical portion of the transmission control system which is shown in Fig. 10 comprises, in general, a centrifugal governor 252, a governor switch 253, the rail switch 105, a kickdown switch 254, the solenoid 183, a relay 255 and a low lockup switch 256. The governor 252 comprises a plurality of weights 257 which are pivotally mounted on a weight carrying member 258. The member 258 is rotated in accordance with the driven shaft 11 of the transmission, being connected thereto by any suitable means such as, for example, a flexible cable 259 driven by gears 260 and 261. The gear 260 is fixed on the driven shaft 11, and the gear 261 is in mesh with the gear 260 and has the cable 259 connected with it. The switch 253 comprises contacts 262 and 263 adapted to be bridged and connected by means of a movable switch arm 264 which is actuated by means of a plunger 265 that is in turn actuated by the weights 257 when they are moved outwardly by centrifugal force.

The kickdown switch 254 comprises contacts 266, 267, 268 and 269. The contacts 266 and 267 constitute a pair which are adapted to be bridged by a switch arm 270 carried on a plunger 271, and the contacts 268 and 269 also constitute a pair adapted to be bridged by the arm 270 in another position. A spring 272 is provided between a collar 273 which is fixed on the plunger 271 and a stationary part 274. The plunger 271 is adapted to be actuated by the accelerator 154 when the accelerator is moved to an open throttle position for changing the transmission from its high forward drive to its low forward drive as will hereinafter be described. The contact 267 is connected by means of a lead 275 with the contact 262 of the governor switch 253.

The rail switch 105 comprises a stationary contact 276 which is grounded and a movable contact 277 adapted to be moved into contact with the contact 276. A spring 278 acts on the movable contact 277 for moving it toward the contact 276, and a plunger 279 actuated by the plunger 103 functions to hold the contact 277 in its illustrated out of contact position when the clutch operating sleeve 55 is in the position in which it is illustrated in Fig. 1. The movable contact 277 is connected by means of a lead 280 with the contact 268 of the kickdown switch 254.

The relay 255 comprises a magnetizable core 281 having a winding 282 surrounding it and a movable armature 283 adapted to be drawn toward the core 281 on energization of the latter. The armature 283 carries two contacts 284 and 285 insulated from each other. The contact 284 is adapted to make contact with a stationary contact 286, and the contact 285 is adapted to make contact with a stationary contact 287. The contact 285 is connected by means of a lead 288 with the contact 269 of the kickdown switch 254.

The relay 255 is connected with the usual ignition system of the vehicle engine which comprises a battery 289 grounded on one terminal and connected by its other terminal with an ignition switch 290. The ignition switch is connected by means of a lead 291 with the low voltage winding 292 of an ignition coil 293. The ignition coil 293 comprises a secondary high voltage winding 294 which, as will be understood, is in accordance with usual practice connected with the spark plugs (not shown) of the vehicle engine. The winding 292 is connected by a lead 295 with the usual interrupter switch 296 and in particular with a movable contact 297 of this switch. The interrupter switch comprises also a stationary contact 298 which is grounded. The movable contact 297 is carried by a pivotally mounted arm 299 which is oscillated about its pivoted end by means of a rotatable, multi-straight sided cam 300. A condenser 301 is connected across the contacts 297 and 298 in accordance with usual practice. The stationary contact 286 of the relay 255 and one end of the winding 282 of this relay are connected by means of a lead 302 with the ignition switch 290. The stationary contact 287 of the relay is connected by means of a lead 303 with a point in the lead 295 between the contact 297 and the primary winding 292 of the ignition coil 293.

One end of the winding 184 of the solenoid 183 is connected with the relay contact 284 through a lead 304 and the armature 283, and the other end of the solenoid winding 184 is grounded.

The lockup switch 256 comprises a stationary contact 305 and a pivotally mounted contact 306. The contact 306 is actuated by the steering column rod 61 so as to be held in contact with the contact 305 when the rod 61 is in its illustrated position engaging the shift rail 63. A spring 307 is provided for moving the contact 306 out of contact with the contact 305 when the steering column rod 61 is moved upwardly to engage the shift rail 64. The movable contact 306 is connected by means of a lead 308 with the contact 266 of the kickdown switch 254, and the stationary contact 305 is connected by means of a lead 309 with one end of the relay winding 282.

In operation of the transmission control system, the transmission is in neutral condition when the selector lever 60 is in its neutral position. The member 62 carried by the rod 61 is within the slot 65 of the rail 63, and the rails 63 and 64 are both in the positions in which they are illustrated in Fig. 10. With the rail 64 in this position, the lever 69 and the members 73 and 83 are in the positions in which they are illustrated in Figs. 2 to 5 with the ball 95 being disposed in the slot 82 of the member 73 allowing unrestricted movement of the fork 93 for the clutch collar 55. With the rail 63 being in its Fig. 10 position, the selector valve 67 connected with the rail is in its neutral position, with the detent ball 224 being disposed in the notch 222 in the valve. It is assumed that the vehicle engine is in operation and that the pump 116 is being driven by means of the gears 129 and 128 from the engine. The pump 116 draws fluid from the sump 132 and discharges it into the conduit 130, and a regulated fluid pressure is present in this conduit and connected conduits due to functioning of the relief valve 117.

When the pressure in the conduit 130 reaches the value for which the valve 117 is set, the piston 135 of the valve, which has the fluid pressure in the conduit 130 impressed on its face through the port 138, moves against the spring 137 to partially open or crack the port 139 and relieve excess fluid from the conduit 130. If the pressure in the conduit 130 tends to increase above this value, the piston 135 will open the port 139 to a greater extent providing greater relief, while, if the fluid in the conduit 130 tends to decrease below this value, the piston 135 moves to close port 139 under the action of the spring 137. The valve 117 may be set to regulate the pressure in the conduit 130 to a value of 50 lbs. per sq. in., for example.

The regulated fluid pressure in the conduit 130 is supplied to the port 151 of the throttle valve 119, but the land 147 blocks the port and prevents flow of fluid therefrom, it being assumed that the accelerator 154 is in a closed throttle, engine idling, position in which it is illustrated in Figs. 9 and 10. The fluid pressure from the conduit 130 is supplied also to the ports 172 and 178 of the solenoid valve 120; however, in the neutral condition of the control system, the solenoid valve 120 is in its closed position in which it is illustrated in Fig. 9, and the lands 163 and 165 block any fluid flow through these ports. The regulated fluid pressure is supplied also to the port 173 of the solenoid valve 120 through the conduit 180, and the fluid pressure flows through the groove 167, the port 174, and the conduit 200 and is impressed on the face 121a of the high-low selector valve 121, holding the valve 121 in the position in which it is illustrated in Fig. 9 in which the detent ball 205 is disposed in the notch 203. Fluid pressure from the conduit 130 is supplied to the port 196 for the valve 121; however, the land 187 blocks this port in the illustrated position of the valve 121. The fluid pressure is supplied also through the conduit 201 to the port 195, and this fluid pressure flows through the groove 189 and the port 194 to the high-low shift piston 96, being impressed on the face 96a of the piston. The fluid pressure holds the piston 96 in its position in which it is illustrated in Fig. 2 with the detent ball 100 being disposed in the notch 98 in the shift rail 92. The fork 93 for the clutch operating sleeve 55 is fixed to the rail, and the fork 93 and shift sleeve 55 are thus held in their illustrated positions corresponding to a low speed forward or a reverse drive, as has been previously explained. Regulated fluid pressure from the conduit 130 is supplied through the conduit 243 to the ports 235 and 240 for the forward and reverse brake selector valve 123; however, for this condition of the controls, the valve 123 is in its illustrated position in which its lands 227 and 229 respectively block the ports 235 and 240. No fluid pressure is thus supplied to the forward and reverse brake servo-motor 106 and 111, as is apparent. The transmission is thus in neutral condition in the position of the controls shown in Fig. 9, since both of the brakes 16 and 17 are disengaged, and the clutch operating sleeve 55 is in its low speed position in which it is illustrated.

Under this condition and all other conditions in which the vehicle engine is in operation, the torque converter 13 is supplied with fluid under a reduced pressure, for example, 25 lbs. per sq. in., for maintaining the converter filled. The excess fluid from the relief valve 117 is supplied through the conduit 140 to the torque converter, and the fluid in the torque converter is maintained at this reduced pressure by means of the relief valve 118. The pressure in the conduit 140 is impressed on a face of the relief valve piston 141 through the port 144 tending to move the piston against the action of the spring 143 to connect the ports 144 and 145. The relief valve 118 functions similarly to the relief valve 117, and the piston 141 opens the port 145 a greater or less amount for maintaining the fluid pressure in the conduit 140 and torque converter 13 at the predetermined reduced pressure.

For obtaining forward drive, the selector lever 60 is moved into its "forward" position indicated in Fig. 10. This movement of the lever 60 through the rod 61 and finger 62, with the latter fitting in the notch 65 of the shift rail 63, causes a movement of the shift rail 63 and thereby of the valve 67, by means of the link 68, into the forward position of the valve 67 with the detent ball 224 resting in the notch 221. In this position of the valve 67, the port 215 remains connected with the exhaust port 216 through the groove 211, and the ports 219 and 218 are connected by means of the groove 212. The conduits 220 and 247 are thus connected for providing a potential source of fluid pressure to the forward and reverse selector valve 123 from the conduit 179 through the ports 170 and 171 and groove 166 of the solenoid valve 120; however, with the accelerator 154 being in its closed throttle position in which it is shown in Fig. 9, there is no fluid pressure supplied to the conduit 179, since the land 147 of the throttle valve 119 blocks the fluid supply port 151. The transmission thus remains in neutral condition, and even though it is conditioned for a forward drive by movement of the selector 60 to its forward position, no power train is actually completed at this time, and there is no tendency for the vehicle to be driven and to creep due to any power transmission through the hydraulic torque converter 13 at engine idling speeds.

A subsequent movement of the accelerator 154 toward open throttle position causes a movement of the throttle valve 119 from its closed position to its open position, and this causes an actual completion of the low speed forward drive power train. When the accelerator 154 is depressed against the spring 160, it moves the part 157 connected with the accelerator in a clockwise direction as seen in Fig. 9, so that the end of the spring 159 held by the part 157 is moved overcenter with respect to the part 158 holding the other end of the spring 159. The accelerator 154 is illustrated in Fig. 9 in its closed throttle position, and the throttle valve 119 is in its closed position corresponding to this position of the accelerator. The parts 157 and 158 in these positions of the accelerator and valve are as illustrated, with the part 157 slightly to the right of the part 158, so that the spring 159 in tending to expand holds the throttle valve 119 bottomed, as illustrated, in the cavity 150. The accelerator 154, when depressed against the spring 160, causes an initial swinging of the part 157 about the pivot point of the accelerator 154 increasing the compression of the spring 159; however, the parts 158, 157, and the valve 119 can have no movement in the direction urged by the spring on this initial movement. Continued throttle opening movement of the accelerator 154 causes the part 157 to be swung to the left as seen in Fig. 9 over the part 158, so that the spring 159 in its tendency to expand forces the part 158 to the right, the part 157 having passed over a center line joining the center of rotation of the accelerator 154 and the center of the spring 159 in its plane of contact with the part 158. When this overcenter movement takes place, the parts 156 and 158 are snapped in a counter-clockwise direction and through the link 161 move the valve 119 leftwardly into its open position. In the open position of the valve 119, the valve connects the ports 152 and 151 through the groove 149, and fluid pressure from the fluid supply conduit 130 thus flows through the port 152, the conduit 179, the port 170, the groove 166, the port 171, the conduit 220, the port 219, the groove 212, the port 218, and the conduit 247 to the forward and reverse brake selector valve 123, and the fluid pressure is impressed on the face 123a of this valve. This fluid pressure application moves the valve 123 to the left as seen in Fig. 9 against the action of the spring 249 effective on the valve 123 through the washer 248. In this position of the valve 123, its groove 230 connects the ports 235 and 236, and fluid pressure thus flows from the conduit 130 through the conduit 243, the port 235, the groove 230, the port 236 and the conduit 244, and the fluid pressure is impressed on the piston 112 for the forward brake 16, causing an application of the forward brake band 49 on the drum 48 through the lever 113 and pin 114. The forward brake 16 is thus engaged, and the low speed forward drive power train through the transmission is completed so that the vehicle is driven at this speed ratio.

The application of fluid pressure to the forward and reverse brake selector valve 123 may be discontinued by a release of the accelerator 154 to its closed throttle, engine idling, position causing a disengagement of the forward brake 16. When the accelerator is thus released, it moves the throttle valve 119 back into its closed position in which it is illustrated in Fig. 9 due to the action of the overcenter mechanism 155, the parts of which return to the positions in which they are illustrated in Fig. 9. In the closed position of the valve 119 which it now occupies, it connects the port 152 with the exhause port 153 through the groove 149, and as has been previously described, the port 152 is connected with the surface 123a of the forward and reverse brake selector valve 123 so that fluid pressure application on this face 123a of the valve 123 is discontinued, and the valve 123 returns to its illustrated position. In this position, the port 236 is connected by the groove 230 with the exhaust port 237 so that fluid pressure on the forward brake piston 112 is drained, and the spring 115 is effective to disengage the band 49 of the brake 16 from its drum 48 to disengage the brake. The transmission is thus again in neutral condition, and a free wheeling action on the vehicle takes place.

While the vehicle is being driven in low forward drive, the action of the governor 252 will cause a conditioning of the transmission mechanism for a subsequent change from low speed forward drive to high speed forward drive by the release of the accelerator and will cause the transmission mechanism to be ineffective for the free wheeling action just described. The rotary member 258 carrying the centrifugal weights 257 is geared to rotate along with the driven shaft 11 as has been described, and when the driven shaft and the vehicle reach predetermined speeds, the weights 257 will be thrown outwardly under centrifugal action sufficiently to move the switch blade 264 by means of the plunger 265 to connect the contacts 262 and 263. This causes a completion of a circuit through the relay winding 282, the circuit being from the ignition switch 290, which is closed whenever the vehicle engine is in operation, through the lead 302, the winding 282, the lead 309, the switch 256, which is closed whenever the selector lever 60 is in its "forward" position, the lead 308, the contact 266 of the kickdown switch 254, the switch blade 270, the contact 267, the lead 275 and the governor switch 253 to ground. The relay 255 is thus energized, and the armature 283 is drawn toward the core 281 so as to close the contacts 284 and 286 and to open the contacts 285 and 287. A circuit is completed by the contacts 284 and 286 energizing the solenoid 183, the circuit being from the ignition switch 290 through the lead 302, the contacts 284 and 286, the armature 283, the lead 304 and the solenoid winding 184 to ground. When the solenoid winding 183 is energized, it draws the solenoid armature 182 inwardly against the action of the spring 185 and moves the solenoid valve 120 from its "closed" to its "open" position.

In the open position of the solenoid valve 120 which is attained when the critical governor speed is reached, the valve connects the ports 171 and 172 by means of the groove 166; it connects the ports 175 and 174 by means of the groove 167; and it connects the ports 178 and 177 by means of the groove 168. As has been previously explained, in starting in low speed forward drive, fluid under pressure is supplied to the port 171 from the port 170 through the throttle valve 119 for applying pressure to the face 123a of the selector valve 123 for the purpose of engaging the forward brake 16. In the open position of the solenoid valve 120, the port 170 is blocked; however, fluid pressure application to the port 171 is continued from the port 172 which is directly connected with the fluid pressure supply conduits 180 and 130, so the selector valve 123 remains actuated and the forward brake 16 remains engaged regardless of any release of the accelerator to a closed throttle position.

Before actuation of the solenoid valve to its "open" position, fluid pressure was applied to the face 121a of the selector valve 121 from the port 174 and the port 173 which is connected with the fluid supply conduit 130 by means of the conduit 180. In the open position of the solenoid valve 120, the port 173 is blocked; however, fluid pressure application to the port 174 is continued, with the accelerator being depressed, from the conduit 179 and port 175. When the solenoid valve 120 is moved to its open position by the action of the governor in reaching its critical speed, fluid pressure is also applied to the face 121b of the selector valve 121, application of fluid pressure being from the conduit 180 through the port 178, the groove 168, the port 177, the conduit 202 and the port 199. Since the two faces 121a and 121b are of substantially the same area, the valve 121 does not move at this time and remains in its illustrated position providing fluid pressure to the face 96a of the high-low shift piston 96 so that movement of this piston does not take place at this time.

The transmission is automatically changed in ratio from low forward speed drive to high forward or direct drive when the accelerator is released to its closed throttle position with the governor remaining above its critical speed. Such a release of the accelerator returns the accelerator valve 119 into its closed position in which it is illustrated in Fig. 9. Fluid pressure application to the face 121a of the selector valve 121 is thus discontinued, the fluid pressure being drained from this face through the port 192, the conduit 200, the port 174, the groove 167, the port 175, the conduit 179, the port 152, the groove 149 and the exhaust port 153. The fluid pressure remains applied to the opposite face 121b of the valve 121, and the valve 121 is thus shifted to the left by the fluid pressure applied to the face 121b to move the valve 121 into its "high" position to connect the ports 194 and 193 by means of the groove 189 and to connect the ports 197 and 196 through the groove 190. Fluid pressure application on the face 96a of the high-low shift piston is thus discontinued, fluid pressure being drained from this face through the port 194, the groove 189 and the exhaust port 193. Fluid pressure is applied to the opposite face 96b of the piston 96, fluid pressure being supplied from the conduit 201, the port 196, the groove 190 and the port 197 to the face 96b. The piston 96 is connected with the clutch operating sleeve 55 as has been previously explained, and the clutch sleeve 51 is thus shifted to engage with the teeth 52 by the piston 96. When the sleeve 51 is engaged with the teeth 52, the direct drive power train is completed as has been previously described. The blocker type synchronizer ring 58 with its teeth 59 between the hub 50 and the carrier 45 functions to prevent an engagement of the sleeve 51 with the teeth 52 until synchronism in speed is obtained between the parts 50 and 45 for assuring a smooth change in drive. The accelerator 154 has been released to initiate this change in drive as has just been described, and the accelerator is continued in its released position in which the vehicle engine is slowing down until the carrier 45 and teeth 52 which are driven indirectly by the vehicle engine slow down sufficiently relative to the hub 50 and driven shaft 11 to allow the clutch sleeve 51 to move into engagement with the teeth 52.

When the shift of the clutch operating sleeve 55 and the sleeve 51 is completed and the accelerator 154 is subsequently depressed, the throttle valve 119 is moved to its open position, and the fluid pressure is again applied to the face 121a of the high-low selector valve 121, this application being from the conduit 130, through the port 151, the groove 149, the port 152, the conduit 179, the port 175, the groove 167, the port 174, the conduit 200 and the port 192. This fluid pressure application to the face 121a, however, has no effect in moving the valve 121, inasmuch as this same fluid pressure is still applied to the opposite piston face 121b through the solenoid valve 120 as has been described.

A change in drive from the high speed forward drive to the low speed forward drive may be obtained by moving the accelerator to fully opened throttle kickdown position to actuate the kickdown switch 254 and move the switch blade 270 out of bridging relation with respect to the contacts 266 and 277 and into bridging relation with the contacts 268 and 269. It is, of course, a natural action for the vehicle operator to depress the accelerator as far as possible if desiring greater torque output from the vehicle power plant. The opening of the contacts 266 and 267 breaks the energizing circuit for the relay winding 282 which has previously been traced, and the relay 255 is thereby deenergized, and its armature 283 moves upwardly to break the contacts 284 and 286 and to close the contacts 285 and 287. The separation of the contacts 284 and 286 deenergizes the solenoid 183, and the spring 185 in the solenoid 183 is effective to move the solenoid valve 120 back into its closed position. Fluid under pressure is released from the piston face 121b of the high-low selector valve 121, the release being through the port 199, the conduit 202, the port 177, the groove 168 and the port 176. Fluid pressure is applied to the piston face 121a from conduit 130 through the port 151, the groove 149 of the throttle valve 119, the port 152, the conduit 179, the port 170, the groove 166, the port 171, the conduit 200 and the port 192, and the fluid pressure is effective to move the valve 121 back into its illustrated position wherein fluid under pressure is applied to the face 96a of the high-low shift piston 96 from the conduits 130 and 201 through the port 195, the groove 189 and the port 194. The piston 96 then tends to move the clutch operating sleeve 55 back into its low speed position.

With the accelerator depressed, there is a substantial transmission of torque through the transmission and without a cessation in this transmittal of torque, the positive type clutch sleeve 51 could not pull out of mesh with the teeth 52. The rail switch 105 is actuated by the spring 104 and the plunger 103 which are carried by the shift rod 92, and when the piston 96 and connected parts are in their high speed drive positions, the plunger 103 is pulled out of engagement with the plunger 279 of the switch 105 allowing the contacts 276 and 277 to close. An engine ignition disabling circuit is completed through the switch 105 and the switch 254, the circuit extending from the lead 295, between the switch 296 and the primary winding 292, through the lead 303, the contact 287, the contact 285, the lead 288, the contact 269, the switch blade 270, the contact 268 and the switch 105 to ground. Thus a point between the distributor switch 296 and the primary winding 292 of the ignition coil 293 is grounded, and the switch 296 is of no effect in providing high voltage surges through the secondary winding 294 of the ignition coil 293 for maintaining the vehicle engine operative, and the engine temporarily ceases firing causing a reversal of torque through the transmission. The fluid pressure applied to the face 96a of the piston 96 is then effective to cause the clutch operating sleeve 55 to move to low speed drive position with the clutch sleeve 51 in engagement with the teeth 53. When this engagement takes place, the plunger 103 moving with the rail 92 acts through the plunger 279 and opens the switch 105 to break the ignition disabling circuit, and the vehicle engine is again operative to transmit torque through the transmission from the drive shaft to the driven shaft, even though the accelerator 154 is maintained in its open throttle position actuating the switch 254 and holding the switch blade 270 in bridging relation with the contacts 269 and 268.

The transmission will also be returned from high speed drive to low speed drive due to a decrease in speed of the vehicle, assuming the accelerator 154 is substantially in its throttle closed engine idling position with little or no torque transmission between the shafts 10 and 11. When the vehicle speed decreases sufficiently, the governor switch arm 264 moves out of bridging relation with the contacts 262 and 263 to break the relay energizing circuit previously traced. The relay 255 is thereby deenergized, and all of the parts of the transmission control system are returned to their low speed conditions. Fluid pressure is applied to the face 96a of the piston 96 as previously described, and the clutch operating sleeve 55 is thereby returned to its low speed position. Since the accelerator 154 is substantially released, there is little or no torque drive through the clutch mechanism 18, and it is free to return to its low speed condition.

Reverse drive is obtained by moving the selector lever 60, while having its finger 62 disposed in the slot 65 in the rail 63 and within the same plane of movement as between the neutral and forward positions of the lever 60, into the "reverse" position of the lever 60 as indicated in Fig. 10. This has the effect through the link 68 of moving the valve 67 into its reverse position in which the detent ball 224 is disposed in the notch 223. When the accelerator is depressed to move the throttle valve 119 to its open position, fluid pressure is applied to the face 123b of the brake selector valve 123, this application of fluid pressure being from the conduit 130 through the port 151, the groove 149, the port 152, the conduit 179, the port 170, the groove 166, the port 171, the conduit 220, the port 214, the groove 211, the port 215, the conduit 246 and the port 241. This application of fluid pressure to the surface 123b moves the brake selector valve 123 into its reverse position in which the groove 231 connects the ports 239 and 240, and fluid pressure is thereby applied to the reverse brake piston 107, the fluid pressure being from the conduits 130 and 243, through the port 240, the groove 231, the port 239 and the conduit 245 to the piston 107. The reverse brake band 47 is thereby engaged with the drum 46 by means of the lever 108 and pin 109. The solenoid valve 120 is in its closed position, and in this position it causes the application of fluid pressure to the face 96a of the high-low shift piston 96. The solenoid valve in its closed position applies fluid pressure to the face 121a of the selector valve 121, this application of pressure being from the conduits 130 and 180, through the port 173, the groove 167, the port 174, conduit 200 and the port 192. The valve 121 is thus assured of being in its low position in which it is illustrated in Fig. 9. In this position, the valve 121 applies fluid pressure to the face 96a of the high-low shift piston 96, the flow of fluid under pressure being from the conduits 130 and 201, through the port 195, the groove 189 and the port 194 to the piston face 96a. The clutch operating sleeve 55 is thus held in its low speed position in which it is illustated in Fig. 1. With the reverse brake 17 engaged and the clutch operating sleeve 55 being in its low speed position, the reverse drive power train through the transmission is completed.

The transmission control system may be set for a drive in low speed forward, exclusive of direct drive even though the critical speed of the governor 252 is exceeded, by moving the selector lever 60 into its low lockup position. This position is attained from the forward position of the lever 60 by simply raising the lever 60 so as to bring the finger 62 into the slot 66 in the rail 64. This movement of the rod 61 has the effect of causing the switch 256 to open under the action of the spring 307 so as to break the circuit from the governor switch 253 to the relay 255 whereby the latter is not energized even though the critical speed of the governor 252 is exceeded. The transmission is thus maintained with its low speed forward drive completed, and the governor is not effective for causing a shift of the solenoid valve 120 into its open position which would condition the transmission control mechanism for a change from low to high speed ratio.

The transmission may be changed into a high lockup condition by rotating the selector lever 60 from its low lockup position to its high lockup position in the same plane. The switch 256 remains open, and the electrical and hydraulic transmission control mechanism shown in Figs. 9 and 10 remains in low speed condition. The movement of the selector lever 60 from its low lockup position to its high lockup position has the effect of moving the shift rail 64 by the finger 62 and causing a movement through the link 70 of the lever 69. This movement of the lever 69 through the shaft 71 rotates the member 73 in a counterclockwise direction so that the detent ball 79 enters the slot 76. A slight counterclockwise movement of the member 73 causes the ball 91 to move longitudinally within the opening 90 in the member 83 and enter the depression 95 in the shift fork 93, so that when the counterclockwise movement of the levers 69 and 73 is continued and completed, the ball 91 causes a corresponding counterclockwise rotation of the member 83 and corresponding movement of the rail 92 and shift fork 93 into their high speed ratio positions in which the clutch sleeve 51 engages the clutch teeth 52. This counterclockwise movement of the member 83 causes the detent ball 87 to seat in the notch 86. The transmission is now in its direct drive condition. As will be appreciated, the ball 91 acts as a clutch for connecting the lever 73 with the shift fork 93 when the levers 69 and 73 are rotated; however, when the levers 69 and 73 are in their nonoperative positions with the detent ball 79 being in the slot 75, the shift fork 93 can have free movement uncoupled with respect to the lever 73 and under the control of the piston 96 as has previously been described.

Our invention advantageously provides a reverse drive, a low speed forward drive and a high speed forward drive, the latter being a direct drive with respect to the planetary gear set 15 and exclusive of it. The manual selector lever 60 advantageously has a reverse position and a drive position both in the same plane in the latter of which the transmission is automatically changed from low speed forward drive to high speed forward drive, and the selector lever 60 may be moved out of this plane in order to either maintain the transmission in low speed forward drive or in high speed forward drive as desired. The vehicle engine may advantageously be started by pushing the vehicle when the selector lever 60 is in its high lockup position completing the direct drive power train, and, in this case, the shaft 11 drives the shaft 12, and the shaft 12 drives the shaft 10 through the one-way clutch 37. The hydraulic valving we show in connection with the transmission advantageously provides improved operation in changing between the various drives through the transmission.

We wish it to be understood that our invention is not to be limited to the specific constructions and arrangements shown and described, except only insofar as the claims may be so limited, as it will be understood to those skilled in the art that changes may be made without departing from the principles of the invention.

We claim:

1. In transmission mechanism, the combination of a drive shaft, a driven shaft, means providing a power train between said shafts and including a clutch for completing the train when engaged and having a control sleeve movable into a clutch engaging position, a servomotor connected with said sleeve for moving the sleeve into clutch engaging position when the motor is energized, a lever having a connection with said clutch sleeve also for moving the sleeve to clutch engaging position on movement of the lever, and releasable means in said connection for breaking the connection when said motor is operable for engaging said clutch whereby said lever is unmoved by said motor when the latter is operative to engage said clutch, said releasable means comprising a ball movable into an indentation in a first member connected with said clutch sleeve and a second lever connected with said first named lever and having an indentation for receiving said ball of such depth that said clutch sleeve may be moved to clutch engaging position with said ball being free of said first member, said indentation in said second lever having slanted camming sides for moving said ball in said indentation in said first member when said second lever is moved for thereby completing the connection between said first named lever and said clutch sleeve.

2. In transmission mechanism, the combination of a drive shaft, a driven shaft, means for respectively providing a low speed forward drive and a high speed forward drive between said shafts, a manually controlled selector lever movable in a plane between a neutral position in which said first named means are rendered inoperative by the lever and a drive position in which said low speed forward drive means is rendered operative by the lever, a governor driven in accordance with the speed of one of said shafts, means under the control of said governor for rendering said high speed forward drive means operative and for completing the high speed forward drive with said selector lever remaining in its said drive position above a predetermined speed of said last named shaft, means controlled by said selector lever for rendering said governor inoperable for changing from said low speed drive to said high speed drive when said selector lever is moved from its said drive position to another position which is out of its said plane, and means for rendering said high speed forward drive means operative and for maintaining it operative outside of the control of said governor when said selector lever is moved from its last named position out of said plane to a second position out of said plane.

3. In transmission mechanism, the combination of a drive shaft, a driven shaft, means for respectively providing a reverse drive, a low speed forward drive and a high speed forward drive between said shafts, a manually controlled selector lever movable in a plane between a neutral position and a drive position in one direction and between said neutral position and a reverse position in the other direction in the plane, said selector lever rendering said low speed forward drive means operative in its said drive position and said reverse drive means operative in its said reverse position, a governor driven in accordance with speed changes of said driven shaft, means under the control of said governor for rendering said high speed forward drive means operative and rendering said low speed forward drive means inoperative with said selector lever remaining in its said drive position above a predetermined speed of said driven shaft and for returning the transmission mechanism to low speed drive when the driven shaft speed falls below this predetermined value, means controlled by said selector lever for overruling the action of said governor for maintaining the transmission mechanism with said low speed forward drive completed when said selector lever is moved from its said drive position to a position out of said plane, and means under the control of said selector lever for completing said high speed forward drive between said shafts and for maintaining this drive completed exclusive of the influence of said governor when said selector lever is moved from its said first position out of said plane to a second position out of said plane.

4. In transmission mechanism for an automotive vehicle having a driving engine, the combination of a drive shaft, a driven shaft, means for providing a forward drive between said shafts and including a friction engaging mechanism for completing the drive when engaged, means for providing a reverse drive between said shafts and including a friction engaging mechanism for completing the drive when engaged, a fluid pressure actuated motor for engaging each of said friction mechanisms, a source of fluid pressure, a relay valve connected with said fluid pressure source and with said motors for connecting said fluid pressure source with one of said motors when the relay valve is moved in one direction and for connecting said fluid pressure source with said other motor when the relay valve is moved in the other direction, an accelerator for the vehicle engine, a throttle valve hydraulically connected with said pressure source and mechanically connected with said accelerator to be opened when the accelerator is moved toward an open throttle position, and a selector valve connected with said throttle valve and with said relay valve, said selector valve when moved into one position connecting said throttle valve with said relay valve so that the throttle valve when opened by movement of the vehicle accelerator supplies fluid pressure to said relay valve to actuate it to engage one of said friction engaging mechanisms and said selector valve when moved into another position connecting said throttle valve with said relay valve so that the throttle valve when opened by movement of said accelerator supplies fluid pressure to said relay valve to actuate it to engage said other friction engaging mechanism.

5. In transmission mechanism, the combination of a drive shaft, a driven shaft, means for respectively providing a low speed drive power train and a high speed drive power train between said shafts, a source of fluid pressure, a fluid pressure operated selector member having a low speed position for rendering said low speed drive means operative in this position and having a high speed position for rendering said high speed drive means operative in the latter position, a first valve having a low speed drive position and a high speed drive position, automatic means for moving said valve from its low speed position to its high speed position, a manually operated valve connected with said pressure source and having an open position for transmitting fluid pressure therethrough and having a closed position in which it blocks fluid pressure application and drains any fluid pressure previously applied through the valve, said first valve in its low speed position connecting said pressure source with said selector member for holding the selector member in its low speed position, and the first valve in its high speed position connecting said selector member through said manually operated valve with said pressure source tending to hold the selector member in its low speed position and connecting said selector member directly with said pressure source tending to move the selector member into its high speed position whereby, when said manually operated valve is moved to its closed position, said selector member is moved by fluid pressure into its high speed position.

6. In transmission mechanism, the combination of a drive shaft, a driven shaft, means for respectively providing a low speed drive power train and a high speed drive power train between said shafts, a source of fluid pressure, a hydraulically operated first control valve having a low speed position and a high speed position in which it respectively connects said pressure source with and renders operative said low speed drive means and said high speed drive means, and a second control valve having a low speed position and a high speed position connecting said pressure source with one side of said first valve for moving it into its low speed position when said second control valve is in its low speed position and connecting the other side of said first valve with said pressure source for moving said first valve into its high speed position when said second control valve is moved into its high speed position.

7. In transmission mechanism for an automotive vehicle, the combination of a drive shaft, a driven shaft, means for respectively providing a low speed forward drive power train and a high speed forward drive power train between said shafts, an engaging means for completing said low speed train, an accelerator for the vehicle, means under the control of said accelerator for engaging said engaging means when the accelerator is moved from a closed throttle position to an open throttle position and for disengaging said engaging means when the accelerator is returned to its closed throttle position with said low speed forward drive power train being operative, means for conditioning the transmission mechanism for a change in drive through the transmission mechanism from said low speed drive to said high speed drive, and means under the control of said drive changing means for maintaining said engaging means engaged regardless of the return of said accelerator to its closed throttle position when the drive changing means is effective to condition for a change to high speed drive.

8. In transmission mechanism for an automotive vehicle, the combination of a drive shaft, a driven shaft, an accelerator for controlling the speed of the vehicle, means for respectively providing a low speed forward drive power train and a high speed forward drive power train between said shafts, a friction engaging mechanism for completing said low speed power train when engaged, a fluid pressure operated motor for engaging said engaging mechanism, a source of fluid pressure, means including a selector valve having a low speed position and a high speed position for conditioning the transmission mechanism for a change in drive from said low speed forward drive to said high speed forward drive, a valve under the control of said accelerator for causing application of fluid pressure from said source to said motor for engaging said friction mechanism when the accelerator is moved from a closed throttle position to an open throttle position and for releasing said fluid pressure on said motor when the accelerator is returned to its closed throttle position with said selector valve being in its low speed drive position, and means under the control of said selector valve for causing continued application of fluid pressure to said motor from said pressure source for maintaining said friction mechanism engaged regardless of movement of said accelerator from its closed throttle position to an open throttle position when the selector valve is in its high speed position.

9. In transmission mechanism, the combination of a drive shaft, a driven shaft, means for providing a first drive between said shafts, means for providing a second drive between said shafts, a source of fluid pressure, a hydraulically operated first control valve having a first drive position and a second drive position in which it respectively connects said pressure source with and renders operative said first drive means and said second drive means, and a second control valve having a first drive position and a second drive position connecting said pressure source with one face of said first valve operative to move it into its first drive position when said second control valve is in its first drive position and connecting another face of said first valve with said pressure source operative to move said first valve into its second drive position when said second control valve is moved into its second drive position.

References Cited in the file of this patent

UNITED STATES PATENTS

| | | |
|---|---|---|
| 2,329,724 | Maurer | Sept. 21, 1943 |
| 2,414,359 | Carnagua | Jan. 14, 1947 |
| 2,456,132 | Lapsely | Dec. 14, 1948 |
| 2,514,002 | Long | July 4, 1950 |
| 2,516,203 | Greenlee | July 25, 1950 |
| 2,516,208 | Hasbany | July 25, 1950 |
| 2,541,391 | Weiss et al. | Feb. 13, 1951 |
| 2,562,464 | Jandasek | July 31, 1951 |
| 2,568,007 | Jandasek | Sept. 18, 1951 |
| 2,615,351 | Kelbel | Oct. 28, 1952 |
| 2,693,260 | Lucia | Nov. 2, 1954 |
| 2,697,363 | Sheppard | Dec. 21, 1954 |

FOREIGN PATENTS

| | | |
|---|---|---|
| 146,668 | Great Britain | July 15, 1920 |
| 607,120 | Great Britain | Aug. 26, 1948 |
| 632,292 | Great Britain | Nov. 21, 1949 |
| 929,571 | France | Dec. 31, 1947 |
| 966,238 | France | Oct. 4, 1950 |